UNITED STATES PATENT OFFICE.

HENRI LE BATES AND EARL P. LAWRENCE, OF PORTSMOUTH, NEW HAMPSHIRE.

PAINT.

SPECIFICATION forming part of Letters Patent No. 431,268, dated July 1, 1890.

Application filed December 12, 1889. Serial No. 333,504. (No specimens.)

*To all whom it may concern:*

Be it known that we, HENRI LE BATES and EARL P. LAWRENCE, of Portsmouth, New Hampshire, have invented an Improvement in Paint, of which the following is a specification.

This invention has for its object to provide a novel paint or coloring compound especially adapted to be used as a substitute for oil-paints in decorative work, but which may be used for ordinary plain work.

Our improved coloring compound or paint is free from oil, and consequently dries very quickly when applied to a surface.

In accordance with our invention a color which may be any of the well-known colors such as now commonly employed—as, for instance, what is commercially known as "flake-white," "chrome-yellow," "rose-pink," "English vermillion," "ultramarine-blue," &c.—has mixed with it a base consisting preferably of the following ingredients, namely: salt, saltpeter, alcohol, molasses, and water.

In order that our invention may be readily comprehended, we will specifically describe one set of proportions by which the base may be made, viz: Three and one-half ounces of salt and three and one-half ounces of saltpeter are dissolved in a gallon of water, and three ounces of alcohol and one-half pint of molasses added. The mixture or base thus formed has added to it a sufficient quantity of the color to make the paint of the desired thickness or consistency, according to the nature of the surface upon which the color is placed.

The paint or coloring compound thus made may be and is especially adapted to be used in decorative work and inside finish, and when applied to the surface the said paint dries very quickly, it taking usually from five to ten minutes. When dried, the paint may be dressed with or have applied to it a hard-oil finish, such as now commonly employed, and which takes about three-fourths to one hour in which to dry. When it is desired to use the paint for ordinary work—such as for outside work—the hard-oil or other finishing coat is used to render the paint water-proof.

It will be noticed that the paint is free from linseed and the other usual oils, and from lead or varnish, and its cost is substantially small as compared with paints as ordinarily made, it being about one-third as cheap.

In practice the base may be made up in a substantially large quantity, and only such quantity mixed with the color as is desired, so that waste of paint is obviated. Furthermore, the paint being soluble in water, one brush may be used for a number of colors.

We do not desire to limit ourselves to the particular proportions mentioned, as they may be changed; but we prefer to use about the proportions specified, as we have obtained excellent results with the same.

Instead of salt or saltpeter we may use other soluble chlorides and nitrates, and instead of molasses we may use sugar.

We claim—

The herein-described paint, it consisting of a color of the character described and a base composed of a soluble chloride and nitrate, alcohol, molasses, and water, substantially as described.

In testimony whereof we have signed our names to this specification in the presence of two subscribing witnesses.

HENRI LE BATES.
     EARL P. LAWRENCE.

Witnesses:
 JAS. H. CHURCHILL,
 E. J. BENNETT.